(12) United States Patent
Kimura et al.

(10) Patent No.: US 10,582,154 B2
(45) Date of Patent: Mar. 3, 2020

(54) PICTURE PRESENTATION SYSTEM

(71) Applicants: NTT DOCOMO, INC., Chiyoda-ku (JP); TOKYO INSTITUTE OF TECHNOLOGY, Meguro-ku (JP)

(72) Inventors: Shinji Kimura, Chiyoda-ku (JP); Kazuhiko Takahashi, Chiyoda-ku (JP); Yuji Aburakawa, Chiyoda-ku (JP); Shunsuke Igarashi, Meguro-ku (JP); Tomoya Nakamura, Meguro-ku (JP); Masahiro Yamaguchi, Meguro-ku (JP)

(73) Assignees: NTT DOCOMO, INC., Chiyoda-ku (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 0 days.

(21) Appl. No.: 16/321,231

(22) PCT Filed: Jul. 3, 2017

(86) PCT No.: PCT/JP2017/024363
§ 371 (c)(1),
(2) Date: Jan. 28, 2019

(87) PCT Pub. No.: WO2018/025551
PCT Pub. Date: Feb. 8, 2018

(65) Prior Publication Data
US 2019/0174093 A1    Jun. 6, 2019

(30) Foreign Application Priority Data

Aug. 4, 2016 (JP) ................. 2016-153504
Sep. 5, 2016 (JP) ................. 2016-172878

(51) Int. Cl.
*H04N 7/14* (2006.01)
*G02B 5/08* (2006.01)
*G02B 5/32* (2006.01)

(52) U.S. Cl.
CPC ............. *H04N 7/144* (2013.01); *G02B 5/08* (2013.01); *G02B 5/32* (2013.01); *H04N 7/142* (2013.01); *H04N 7/147* (2013.01)

(58) Field of Classification Search
CPC ........ H04N 7/144; H04N 7/142; H04N 7/147; G02B 5/32; G02B 5/08
See application file for complete search history.

(56) References Cited

U.S. PATENT DOCUMENTS

| 2004/0004586 A1 | 1/2004 | Endo et al. |
| 2007/0133076 A1 | 6/2007 | Endo et al. |

(Continued)

FOREIGN PATENT DOCUMENTS

| JP | 5-328336 A | 12/1993 |
| JP | 2002-107654 A | 4/2002 |
| JP | 2006-237914 A | 9/2006 |

OTHER PUBLICATIONS

International Preliminary Report on Patentability and Written Opinion dated Feb. 14, 2019 in PCT/JP2017/024363 (submitting English translation only).

(Continued)

*Primary Examiner* — Stella L. Woo
(74) *Attorney, Agent, or Firm* — Oblon, McClelland, Maier & Neustadt, L.L.P.

(57) ABSTRACT

A picture presentation system 1 presents a user U with a picture where a virtual image Di is created in a space in front of the user U. The picture presentation system 1 includes a hologram mirror 10 configured to reflect a picture composed of light of a specific wavelength at an angle different from an angle of incidence and transmit light other than the light of the specific wavelength, and a screen 20 configured to display the picture toward the hologram mirror. The hologram mirror 10, being placed opposite to the user U, reflects the picture from the screen 20 in such a way that the user U (Continued)

can visually recognize the virtual image Di of the picture at a position on the opposite side from the user U across the hologram mirror 10 (arrow AR1).

6 Claims, 7 Drawing Sheets

(56) References Cited

U.S. PATENT DOCUMENTS

2009/0278913 A1* 11/2009 Rosenfeld .............. H04N 7/144
  348/14.16
2012/0287223 A1 11/2012 Zhang et al.
2015/0341593 A1 11/2015 Zhang et al.
2016/0227164 A1* 8/2016 Klug ................... G02B 5/1842

OTHER PUBLICATIONS

Murase, K. et al. "Immersive Augmented Reality Environment Using Large Semi-transparent Mirror and the Representation of Correct Occlusion Effect" Transactions of the Virtual Reality Society of Japan, vol. 13, No. 2, 2008, 16 Pages. (with English abstract and partial English translation).
International Search Report dated Sep. 5, 2017, in PCT/JP2017/024363, filed Jul. 3, 2017.
Extended European Search Report dated Jun. 3, 2019 in European Patent Application No. 17836658.9, 8 pages.
Office Action dated Dec. 17, 2019 in Japanese Application No. 2016-172878 (w/English translation).

* cited by examiner

PICTURE PRESENTATION SYSTEM

TECHNICAL FIELD

The present invention relates to a picture presentation system.

BACKGROUND ART

Non Patent Literature 1 discloses a picture presentation system using a large semi-transparent mirror film (which is hereinafter sometimes referred to simply as "semi-transparent mirror"). In this system, a floor screen and a semi-transparent mirror are placed in front of a user. The floor screen is placed horizontally on a floor. The semi-transparent mirror is placed in front of a user above the floor screen, and the level of illumination is generally set lower on the backside of the semi-transparent mirror than in the place where the user is. The semi-transparent mirror is tilted at an angle of 45 degrees with respect to the floor screen so that the distance from the floor screen increases as the semi-transparent mirror becomes closer to the user.

In the above configuration, when a picture is projected from a projector onto the floor screen, the picture projected on the floor screen is incident on the semi-transparent mirror, reflected at the angle of reflection which is equal to the angle of incidence, and presented as a virtual image to a user. Because the semi-transparent mirror is tilted at an angle of 45 degrees as described above, it appears to a user that the virtual image of the picture is floating in a front space located on the opposite side from the user across the semi-transparent mirror. In this manner, by creating a virtual image in the space in front of a user (which is hereinafter sometimes referred to as "front space"), it is possible to present the user with a picture that looks as if an object shown in the virtual image was present in front of the user.

CITATION LIST

Non Patent Literature

NPL1: Kaori Murase, Tetsuro Ogi, Kota Saito and Takahide Koyama "Immersive Augmented Reality Environment Using Large Semi-transparent Mirror and the Representation of Correct Occlusion Effect", [online], Transactions of the Virtual Reality Society of Japan, Vol. 13, No. 2, pp. 141-150, 2008.6, [Searched on Jul. 15 2016], Internet <URL: http://lab.sdm.keio.ac.jp/ogi/papers/TVRSJ2008-murase.pdf>

SUMMARY OF INVENTION

Technical Problem

The technique that presents a user with a picture where a virtual image is created in the front space is applicable to a video telephone or the like. For example, it is feasible to implement interactive communication in such a situation just as if the other party on the phone were in front of a user by presenting the user with a picture where a virtual image of the other party is created in the front space.

In the system disclosed in Non Patent Literature 1, the semi-transparent mirror is placed at an angle of 45 degrees in front of a user, and therefore a large space is needed in front of the user, which causes an increase in system size. The increase in system size leads to an increase in distance from a user to a space located on the opposite side from the user across the semi-transparent mirror, which is the distance between the user and the virtual image of the other party created in the front space. The increase in this distance makes it difficult to implement interactive communication in such a situation as if the other party were just in front of the user. Therefore, there is a need for a system with a simpler configuration which achieves miniaturization or the like.

The present invention has been accomplished to solve the above problem and an object of the present invention is thus to provide a picture presentation system with a simpler configuration capable of presenting a picture where a virtual image is created in a front space.

Solution to Problem

A picture presentation system according to one aspect of the present invention is a picture presentation system that shows a user with a virtual image in a space in front of a user, including a hologram mirror configured to reflect light of a specific wavelength at an angle different from an angle of incidence and transmit light other than the light of the specific wavelength, and a screen configured to display the picture toward the hologram mirror, wherein the hologram mirror, being placed opposite to a user, reflects the picture from the screen in such a way that the user can visually recognize a virtual image of the picture at a position on the opposite side from the user across the hologram mirror.

In the above picture presentation system, a hologram mirror that reflects light of a specific wavelength at an angle different from an angle of incidence and transmits light other than the light of the specific wavelength, and a screen that displays the picture toward the hologram mirror are used. Because the hologram mirror transmits light other than light of a specific wavelength, the user can visually recognize the front space located on the opposite side from the user across the hologram mirror. On the other hand, the hologram mirror, being placed opposite to a user, reflects the picture from the screen in such a way that the user can visually recognize a virtual image of the picture at a position on the opposite side from the user across the hologram mirror. Therefore, it is possible to create a virtual image of a picture in the front space described above and present the user with a picture that looks as if the virtual image (i.e., the subject of the picture) was present in front of the user. In the state where the hologram mirror is placed opposite to the user, a space in front of the user is reduced compared with the state where the semi-transparent mirror is placed in front of a user at an angle of 45 degrees as described in Non Patent Literature 1. Further, there is no need to maintain the semi-transparent mirror tilted at an angle of 45 degrees as in Non Patent Literature 1. Thus, according to the above-described picture presentation system, it is possible to present a picture where a virtual image is created in a front space in a simpler configuration. For example, since the space in front of the user is reduced, it is possible to achieve interactive communication in the situation as if the other party was just in front of the user.

The picture presentation system may further include a camera configured to take a picture of the hologram mirror from a user side, and the camera may be placed so as to take a virtual image of the user at a position on the opposite side from the camera across the hologram mirror. It is thereby possible to take a picture of the front view of the user by the camera. For example, the front view of the user taken by the above-described camera is presented as a picture to the other party using the same picture presentation system in a video telephone or the like, and thereby the eye level of the user in the presented picture becomes substantially the same as that when viewing the other party from the front. This is the same for the eye level of the other party when viewed from the user. This enables eye level communication (eye contact) between the user and the other party.

The screen may be configured to alternately switch between two states: a first state of displaying the picture toward the hologram mirror and a second state of transmitting light without displaying the picture, and the camera may be placed on the opposite side from the hologram mirror across the screen. Thus, when the screen is in the first state, it is possible to present the user with a picture. When, on the other hand, the screen is in the second state, it is possible to take a virtual image of the user by the camera. The camera is placed on the opposite side from the hologram mirror across the screen. In this case, because the screen and the camera are located in the same direction when viewed from the hologram mirror, it is possible to improve the accuracy of enabling the user to visually recognize in front the virtual image of a picture from the screen and improve the accuracy of enabling the camera to take the virtual image of the user in front at the same time.

The picture presentation system may further include a mirror placed on the opposite side from the hologram mirror across the screen, and the camera may be placed so as to take a picture of the hologram mirror by using reflection on the mirror. Alternatively, the picture presentation system may further include a semi-transparent mirror placed between the hologram mirror and the screen, and the camera may be placed so as to take a picture of the hologram mirror by using reflection on the semi-transparent mirror. By using the reflection of the mirror or the semi-transparent mirror in this manner, it is possible to increase the freedom of the mounting position of the camera.

Alternatively, the picture presentation system may further include a camera placed behind the hologram mirror when viewed from the user, and the camera may take a picture of the user through the hologram mirror. In this case also, it is possible to take a picture of the front view of the user by the camera.

Advantageous Effects of Invention

According to the present invention, it is possible to present a picture where a virtual image is created in a front space in a simpler configuration.

DESCRIPTION OF EMBODIMENTS

An embodiment of the present invention is described hereinafter with reference to the drawings. Note that, in the description of the drawings, the same elements are denoted by the same reference symbols and redundant description thereof is omitted.

Figure 1:
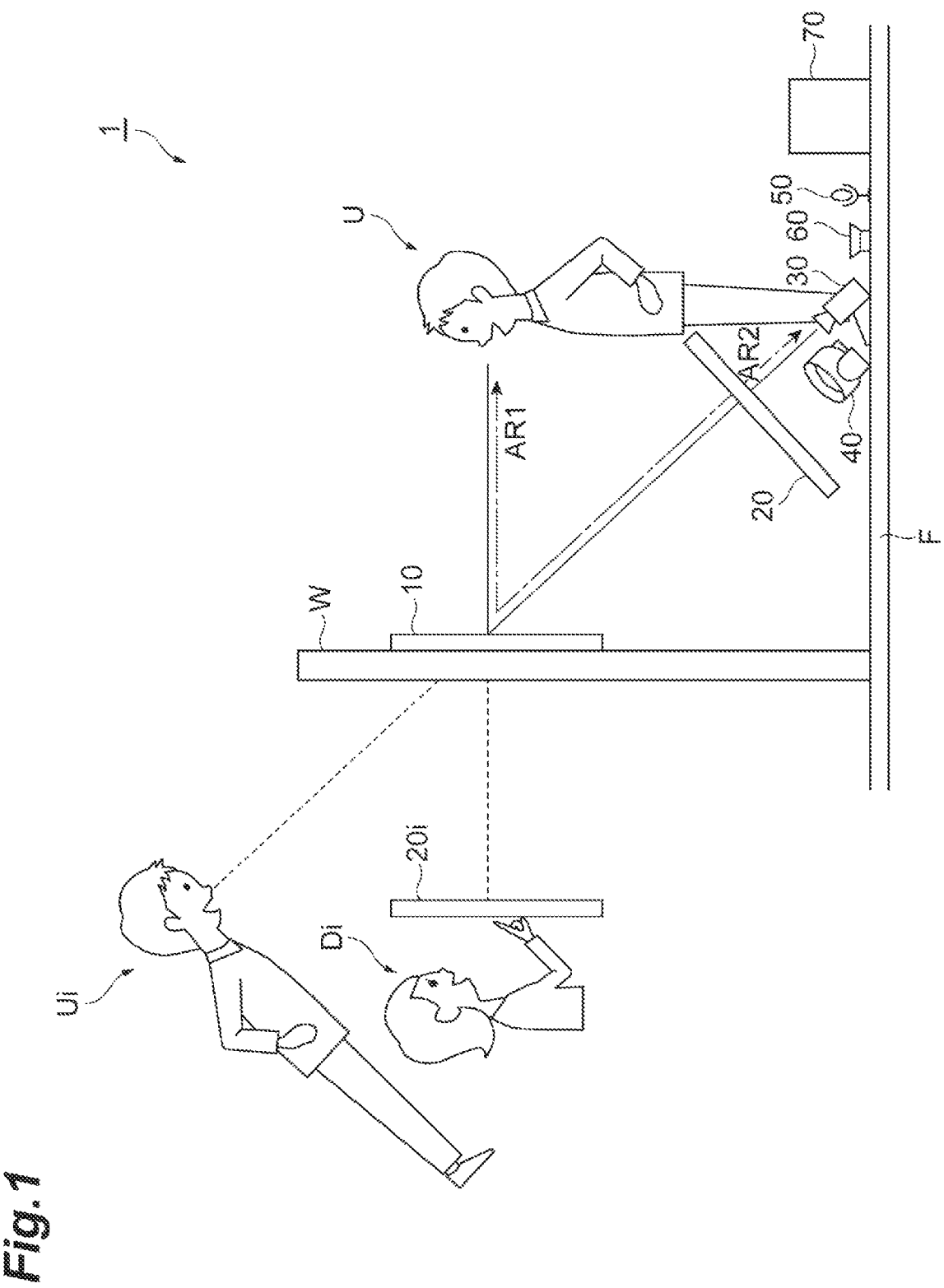
FIG. 1 is a view showing the configuration of a picture presentation system.

FIG. 1 is a view showing the configuration of a picture presentation system according to an embodiment. A picture presentation system 1 is a system that presents a user U with a picture where a virtual image is created in a space in front of the user U (front space), and it is used for interactive communication, for example. An example of interactive communication is a video telephone. FIG. 1 shows the way that the user U performs interactive communication with the other party D (a virtual image Di of the other party is shown in the figure) by using the picture presentation system 1.

The picture presentation system 1 includes a hologram mirror 10, a screen 20, a camera 30, a projector 40, a microphone 50, a speaker 60, and a control device 70.

The hologram mirror 10 is produced by performing exposure on a sheet-like hologram material, for example. A hologram material used for an optical system such as a lens or a mirror is generally called HOE (Holographic Optical Element). An example of a material of HOE (hologram material) is photopolymer. The exposure of HOE is performed by applying coherent light such as laser to the both sides of HOE at different angles from each other. The hologram mirror 10 obtained in this manner has two characteristics: wavefront reproducibility and wavelength selectivity, which are described below.

The wavefront reproducibility is characteristics that reproduce a light path during exposure. The light path during exposure is a path that combines the paths of light respectively applied to the both sides of HOE described above. The hologram mirror 10 having wavefront reproducibility has a function as a lens that refracts and reflects light according to the light path during exposure. By adjusting the angle of light applied during exposure, the hologram mirror 10 can serve as an off-axis mirror that reflects incident light at a desired angle of reflection which is different from the angle of incidence.

The wavelength selectivity is characteristics that exhibit the above-described function as a lens only for light of the same wavelength as the wavelength of light used for exposure and transmit light of other wavelengths. The light used for exposure may be light that is a combination of a plurality of different wavelengths. Because the hologram mirror 10 having wavelength selectivity transmits light of wavelengths other than a specific wavelength, the user U can visually recognize the front space on the opposite side from the user U across the hologram mirror 10.

With the two characteristics, i.e., wavefront reproducibility and the wavelength selectivity, as described above, the hologram mirror 10 can be configured to reflect light of a specific wavelength at an angle different from the angle of incidence and transmit light of wavelengths other than the specific wavelength, for example. The specific wavelength is set to include the wavelength of light that constitutes a picture to be displayed on the screen 20 which is described later. For example, when a picture is composed of monochromatic light such as R (red), G (green) or B (blue), the specific wavelength is set to include the wavelength of this monochromatic light. When a picture is composed of three primary colors, i.e., RGB, the specific wavelength is set to include the wavelengths of light of three primary colors RGB.

The screen 20 displays a picture toward the hologram mirror 10 from a position closer to the user U than the hologram mirror 10. An example of the picture is a picture showing the front view of the other party D on the telephone.

The screen 20 has the shape of a substantially flat plate or sheet. A projector screen may be used as the screen 20. In the example shown in FIG. 1, the screen 20 is a transmissive screen capable of both front projection and rear projection. The transmissive screen is made using a transmissive film, for example. By using a nearly transparent (e.g., semi-transparent) transmissive film, the screen 20 is transmissive when nothing is projected by the projector.

A picture from the projector 40 is projected on the screen 20. The projector 40 is placed in such a way that the user U is not present on the optical path from the projector 40 to the screen 20. The number of frames for projection is 60 frames per second, for example. The projector 40 projects a picture on the screen 20 from a position closer to the user U than the hologram mirror 10. In this example, the projector 40 projects a picture on the backside of the screen 20. The projector 40 can be controlled by the control device 70, which is described later, to alternately switch between the state of projecting a picture and the state of not projecting a picture. In the state where the projector 40 projects a picture, the screen 20 is in the state of displaying a picture toward the hologram mirror 10 (first state). In the state where the projector 40 does not project a picture, the screen 20 is in the state of transmitting light without displaying a picture (second state). The screen 20 can be configured to alternately switch between the first state and the second state.

The camera 30 takes a picture of the hologram mirror 10 from a position closer to the user U than the hologram mirror 10. The number of frames for picture taking is 60 frames per second, for example. The microphone 50 collects ambient sounds at a position closer to the user U than the hologram mirror 10. An example of sounds collected by the microphone 50 is the voice of the user U. The speaker 60 outputs sounds to the user U from a position closer to the user U than the hologram mirror 10. An example of sounds output from the speaker 60 is the voice of the other party D.

The control device 70 controls each of the elements included in the picture presentation system 1. The functions of the control device 70 are described later with reference to FIG. 2. The hardware configuration of the control device 70 is also described later.

The picture presentation system 1 can be used indoors, for example. In the example shown in FIG. 1, the hologram mirror 10 is placed on a wall W. In this example, the wall W stands vertically to a floor F, and therefore the hologram mirror 10 is also placed vertically. The wall W may be made using an opaque material like a normal wall. The camera 30, the projector 40, the speaker 60, the microphone 50, and the control device 70 are placed on the floor F closer to the user U than the wall W. The screen 20 may be mounted on the floor F using a fixation member (not shown), for example. The user U conducts a dialogue with the other party D by using the picture presentation system 1 at a position facing the hologram mirror 10. In other words, the picture presentation system 1 is used in the state where the hologram mirror 10 is placed opposite to the user U.

In this embodiment, the hologram mirror 10 reflects a picture from the screen 20 in such a way that the user U can visually recognize the virtual image of the picture at a position on the opposite side from the user U across the hologram mirror 10 (arrow AR1). Such reflection characteristics can be achieved by adjusting the angle of light applied during exposure of HOE, which is described earlier, in accordance with the positional relationship between the hologram mirror 10 and the screen 20. Because the hologram mirror 10 is placed opposite to the user U, the user U can see a picture where a virtual image 20i of the screen 20 (i.e., the virtual image Di of the other party D) is created in the space at the back of the hologram mirror 10.

Further, the camera 30 is placed to be able to take the virtual image Ui of the user U at a position on the opposite side from the camera 30 across the hologram mirror 10. Because the hologram mirror 10 has the above-described reflection characteristics (arrow AR1), the camera 30 is placed so that it is located in substantially the same direction as the screen 20 when viewed from the hologram mirror 10 (arrow AR2). For example, the screen 20 and the camera 30 may be placed in parallel when viewed from the hologram mirror 10. If the screen 20 is a transmissive screen, the screen 20 and the camera 30 may be arranged to overlap with each other so that the camera 30 is located behind the screen 20 when viewed from the hologram mirror 10. In this case, the camera 30 is placed on the opposite side from the hologram mirror 10 across the screen 20. As described earlier, because the hologram mirror 10 is placed opposite to the user U, the camera 30 can take the front view of the user U.

Figure 2:
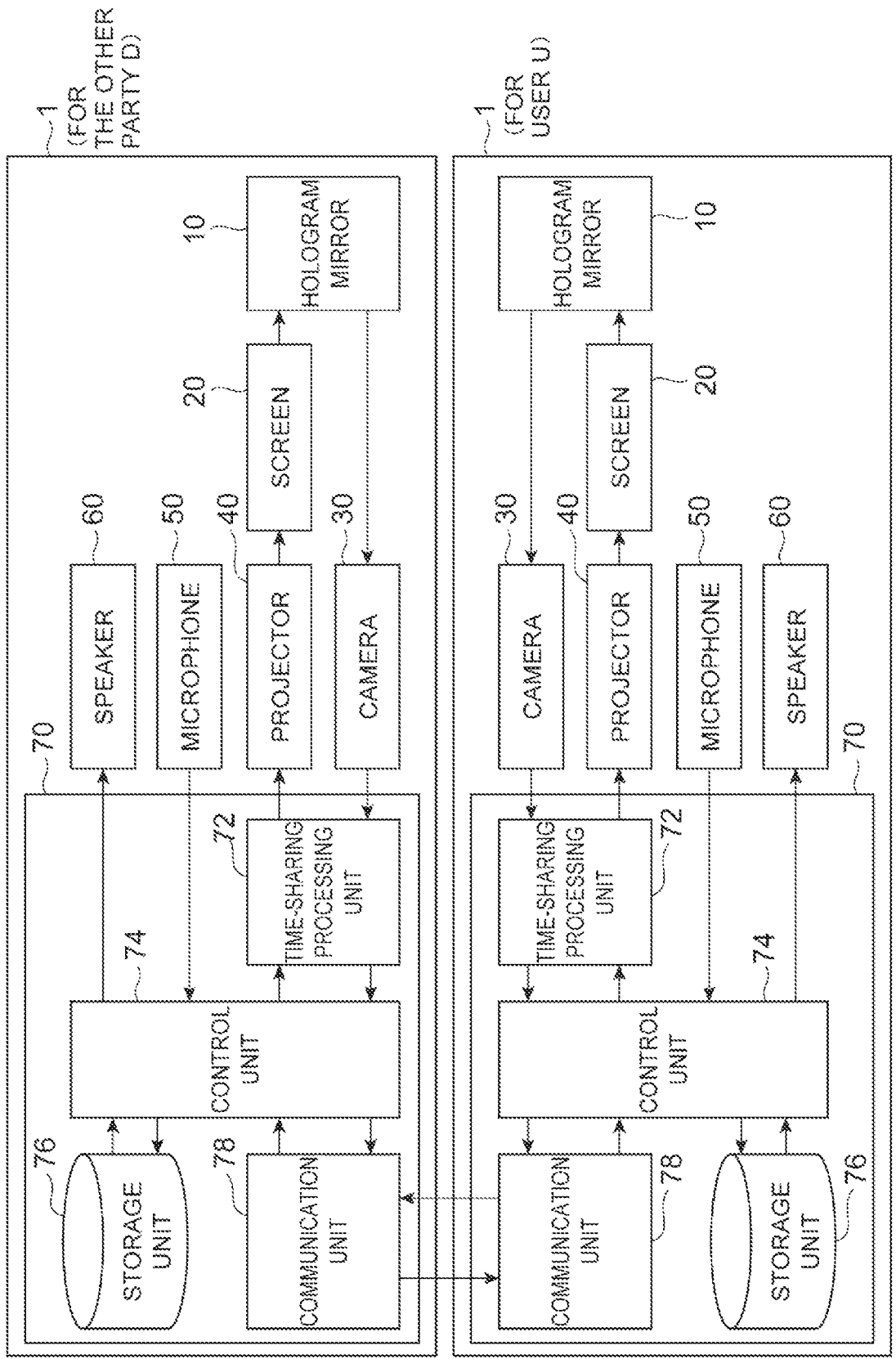
FIG. 2 is a block diagram of the picture presentation system.

FIG. 2 is a block diagram of the picture presentation system. FIG. 2 shows block diagrams of two picture presentation systems capable of communicating with each other. One picture presentation system 1 is used by the user U, and the other picture presentation system 1 is used by the other party D.

The hologram mirror 10, the screen 20, the camera 30, the projector 40, the microphone 50 and the speaker 60 included in the picture presentation system 1 are as described earlier with reference to FIG. 1. FIG. 2 further shows the detailed configuration of the control device 70. To be specific, the control device 70 is configured to be able to control the camera 30, the projector 40, the microphone 50 and the speaker 60, and it includes, as functional blocks, a time-sharing processing unit 72, a control unit 74, a storage unit 76, and a communication unit 78.

The time-sharing processing unit 72 performs processing (time-sharing processing) that temporally switches between a mode of displaying a display picture by the screen 20 (display mode) and a mode of capturing a picture taken by the camera 30 (capture mode) and executes each mode. In the display mode, a picture of the other party is projected from the projector 40 to the screen 20, and the picture is displayed by the screen 20. The other party is the other party D in the picture presentation system 1 that is used by the user U, and it is the user U in the picture presentation system 1 that is used by the other party D. In the display mode, the screen 20 is in the above-described first state (the state of displaying a picture toward the hologram mirror 10). The picture taken by the camera 30 does not need to be captured. In the capture mode, projection of a picture from the projector 40 to the screen 20 is stopped (interrupted), and the picture taken by the camera 30 is captured. The screen 20 is in the above-described second state (the transmission state of transmitting light without displaying a picture).

The time-sharing processing unit 72 divides one second into 120 frames, and alternately executes the capture mode and the display mode in each frame. In this case, the time-sharing processing unit 72 controls the projector 40 so as to project a picture on the screen 20 in 60 frames where the display mode is executed out of 120 frames. The time-sharing processing unit 72 may control the camera 30 so as to take a picture in 60 frames where the capture mode is executed out of 120 frames, or may control the camera 30 so as to take a picture in all 120 frames. In the latter case, pictures of 60 frames where the capture mode is executed are captured by thinning-out among pictures of 120 frames taken by the camera 30, for example.

Note that the above-described time-sharing processing is executed in the case where the screen 20 is a transmissive screen and the camera 30 takes a picture of the hologram mirror 10 through the screen 20. Specifically, as described above, in the case where the camera 30 is located on the opposite side from the hologram mirror 10 across the screen 20, if a picture is displayed on the screen 20, this picture is also taken by the camera 30. By performing the above-described time-sharing processing, the timing of displaying a picture by the screen 20 and the timing of taking a picture by the camera 30 can be differentiated from each other, which prevents a picture displayed on the screen 20 from being taken by the camera 30. On the other hand, in the case where the camera 30 can take a picture of the hologram mirror 10 without through the screen 20, such as when the screen 20 and the camera 30 are located not overlapping with each other (the screen 20 and the camera 30 are spatially divided) when viewed from the hologram mirror 10, for example, a picture displayed on the screen 20 is not taken by the camera 30, and the above-described time-sharing processing is not needed. When not performing the time-sharing processing, pictures taken by the camera 30 may be captured at a rate of 60 frames per second, and pictures from the control unit 74 may be displayed on the screen 20 at a rate of 60 frames per second.

The control unit 74 is a part that makes overall control of the control device 70 by controlling each of the elements included in the control device 70. The storage unit 76 is a part that stores various types of information required for processing to be executed by the control device 70. For example, the storage unit 76 stores a program for implementing each function of the control device 70. The communication unit 78 is a part that communicates with the outside of the picture presentation system 1. In the example shown in FIG. 2, the picture presentation system 1 used by the user U and the picture presentation system 1 used by the other party D can communicate with each other via the communication unit 78 of each system.

The overview of the operation of the picture presentation system 1 is described hereinafter with reference to FIG. 2 together with FIG. 1. In the picture presentation system 1 used by the user U, the camera 30 takes a picture (virtual image Ui) of the user U reflected by the hologram mirror 10. The picture taken by the camera 30 is transmitted through the communication unit 78 to the communication unit 78 of the picture presentation system 1 used by the other party D. In the picture presentation system 1 used by the other party D, the projector 40 projects the picture received by the communication unit 78 on the screen 20. The screen 20 displays the picture toward the hologram mirror 10. In this manner, the other party D can visually recognize the virtual image of the picture of the screen 20 (i.e., the front view of the user U) in the space on the opposite side from the other party D across the hologram mirror 10 (the front space of the other party D).

Further, in the picture presentation system 1 used by the other party D, the camera 30 takes a picture (virtual image Di) of the other party D reflected by the hologram mirror 10. The picture taken by the camera 30 is transmitted through the communication unit 78 to the communication unit 78 of the picture presentation system 1 used by the user U. In the picture presentation system 1 used by the user U, the projector 40 projects the picture received by the communication unit 78 on the screen 20. The screen 20 displays the picture toward the hologram mirror 10. In this manner, the user U can visually recognize the virtual image of the picture of the screen 20 (i.e., the front view of the other party D) in the space on the opposite side from the user U across the hologram mirror 10 (the front space of the user U).

Further, in the picture presentation system 1 used by the user U, the microphone 50 collects the voice of the user U. The sound collected by the microphone 50 is transmitted through the communication unit 78 to the communication unit 78 of the picture presentation system 1 used by the other party D. In the picture presentation system 1 used by the other party D, the sound received by the communication unit 78 is output from the speaker 60. In this manner, the other party D can hear the voice of the user U.

Further, in the picture presentation system 1 used by the other party D, the microphone 50 collects the voice of the other party D. The sound collected by the microphone 50 is transmitted through the communication unit 78 to the communication unit 78 of the picture presentation system 1 used by the user U. In the picture presentation system 1 used by the user U, the sound received by the communication unit 78 is output from the speaker 60. In this manner, the user U can hear the voice of the other party D.

As described above, by transmitting and receiving the pictures and the voice of the user U and the other party D between the picture presentation systems 1 respectively used by them, interactive communication between the user U and the other party D is performed.

The operations and effects of the picture presentation systems 1 are described hereinafter. In the picture presentation systems 1, the hologram mirror 10 that reflects a picture composed of light of a specific wavelength (e.g., light of three primary colors RGB) at an angle different from the angle of incidence and transmits light other than the light of the specific wavelength, and the screen 20 that displays the picture toward the hologram mirror 10 are used. Because the hologram mirror 10 transmits light other than light of a specific wavelength, the user U can visually recognize the front space located on the opposite side from the user U across the hologram mirror 10. On the other hand, the hologram mirror 10, which is placed opposite to the user, reflects a picture from the screen 20 in such a way that the user U can visually recognize the virtual image of the picture, which is the picture of the other party D, at a position on the opposite side from the user U across the hologram mirror 10. Therefore, it is possible to create a virtual image of a picture in the front space described above and present the user U with a picture that looks as if the virtual image (i.e., the other party D) was present in front of the user U.

In the state where the hologram mirror 10 is placed opposite to the user U, a space in front of the user U is reduced compared with the state where the semi-transparent mirror is placed in front of a user at an angle of 45 degrees as described in Non Patent Literature 1. Further, there is no need to maintain the semi-transparent mirror tilted at an angle of 45 degrees as in Non Patent Literature 1. Thus, according to the picture presentation system 1, it is possible to present a picture where a virtual image is created in a front space in a simpler configuration. For example, since the space in front of the user U is reduced, it is possible to achieve interactive communication in the situation as if the other party D was just in front of the user.

In addition, the picture presentation system 1 further includes the camera 30 that takes a picture of the hologram mirror 10 from a position closer to the user U, and the camera 30 is placed so as to take a virtual image of the user U at a position on the opposite side from the camera 30 across the hologram mirror 10. It is thereby possible to take a picture of the front view of the user U by the camera. For example, the front view of the user U taken by the camera 30 is presented as a picture to the other party D using the same picture presentation system 1 in a video telephone or the like, and thereby the eye level of the user U in the presented picture becomes substantially the same as that when viewing the other party D from the front. This is the same for the eye level of the other party D when viewed from the user U. This enables eye level communication (eye contact) between the user U and the other party D.

Further, when the screen 20 is a transmissive screen, the screen 20 may be configured to alternately switch between two states: the first state of displaying a picture toward the hologram mirror 10 and the second state of transmitting light without displaying a picture, and the camera 30 may be placed on the opposite side from the hologram mirror 10 across the screen 20. Thus, when the screen 20 is in the first state, it is possible to present the user U with a picture (the virtual image Di of the other party D). When, on the other hand, the screen 20 is in the second state, it is possible to take the virtual image Ui of the user U by the camera 30 through the screen 20. In this case, because the screen 20 and the camera 30 are located in the same direction when viewed from the hologram mirror 10, when the user U can visually recognize in front the virtual image of a picture (the picture of the other party D) from the screen 20, the camera 30 can also take the virtual image Ui of the user U in front. Therefore, it is possible to improve the accuracy of enabling the user U to visually recognize in front the virtual image of a picture from the screen 20 and improve the accuracy of enabling the camera 30 to take the virtual image Ui of the user U in front at the same time.

Further, in the picture presentation system 1, the elements other than the hologram mirror 10, which are the screen 20, the camera 30, the projector 40, the microphone 50, the speaker 60 and the control device 70, can be placed closer to the user U than the hologram mirror 10. This eliminates the need for a space at the back of the hologram mirror 10 (on the opposite side from the user), which also makes the system configuration simpler.

Further, when the screen 20 is placed on the floor F, the screen 20 is less visible to the user U. The projector 40 is located in such a way that the user U is not present on the optical path from the projector 40 to the screen 20. The user U can thereby see the picture of the other party D created in the front space without being aware of the picture projected on the screen 20, and it is thus possible to interact with the other party D with a feeling like actually being face to face with the other party D.

The picture presentation system according to this embodiment is not limited to have the configuration shown in FIGS. 1 and 2. Various configurations can be adopted within the range where the fundamental principles that project a picture on the screen, create a virtual image in the front space on the opposite side from a user across the hologram mirror, and take a virtual image of the front view of a user in front by the camera are achieved. Several examples are described hereinafter with reference to FIGS. 3 to 6.

Figure 3:
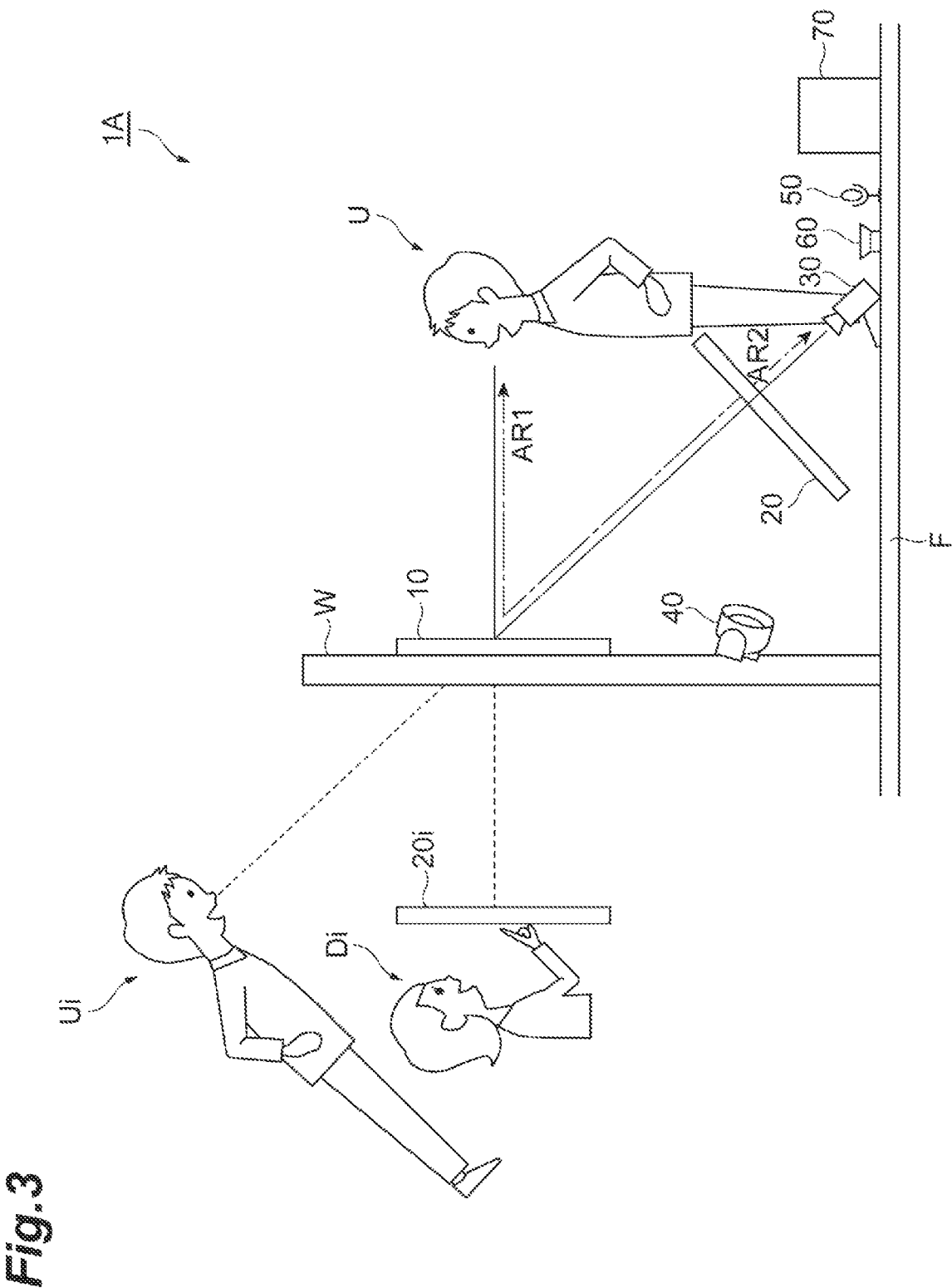
FIG. 3 is a view showing another example of the configuration of the picture presentation system.

A picture presentation system 1A shown in FIG. 3 is different from the picture presentation system 1 (FIG. 1) in the position of the projector 40. The projector 40 is placed closer to the hologram mirror 10 than the screen 20 so as to project a picture on the front side (the side facing the hologram mirror 10) of the screen 20. In this example, the projector 40 is mounted on a part of the wall W below the hologram mirror 10. According to the picture presentation system 1A, it is possible to increase the freedom of the mounting position of the projector 40 because it allows mounting the projector 40 at a position closer to the hologram mirror 10 than the screen 20, for example.

Figure 4:
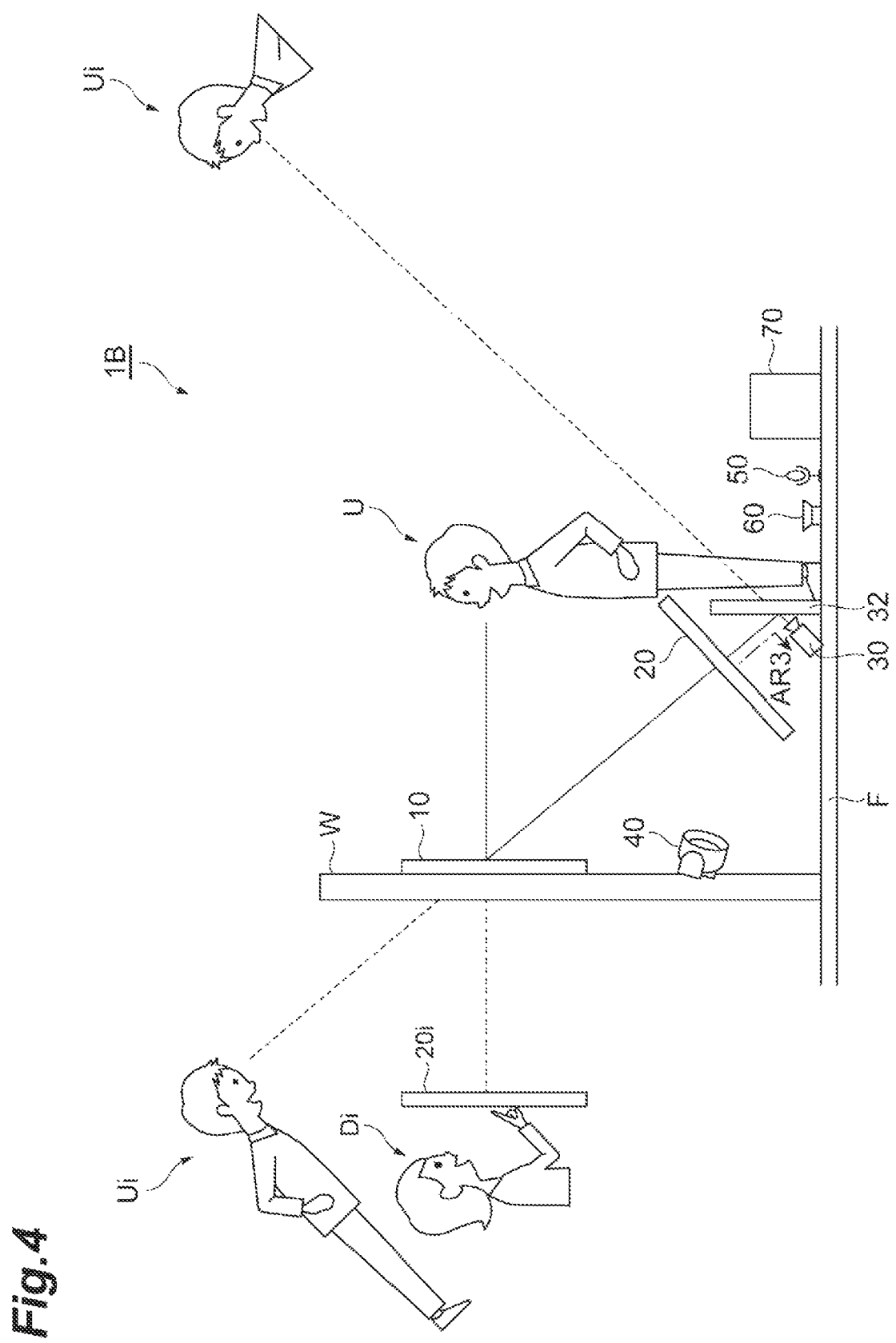
FIG. 4 is a view showing another example of the configuration of the picture presentation system.

A picture presentation system 1B shown in FIG. 4 is different from the picture presentation system 1A (FIG. 3) in that it further includes a mirror 32 and in the position of the camera 30. The mirror 32 is placed on the opposite side from the hologram mirror 10 across the screen 20. The camera 30 is placed so as to take a picture of the hologram mirror 10 by using reflection on the mirror 32 (arrow AR3). In the example shown in FIG. 4, the mirror 32 is placed vertically on the floor F in such a way that the reflecting surface of the mirror 32 faces the wall W. The camera 30 is mounted on the floor F so as to take a picture of the reflecting surface (the surface facing the screen 20) of the mirror 32. Note that, however, the positions of the mirror 32 and the camera 30 are not limited to the example shown in FIG. 4. According to the picture presentation system 1B, because the camera 30 uses the reflection of the mirror 32, it is possible to increase the freedom of the mounting position of the camera 30.

Figure 5:
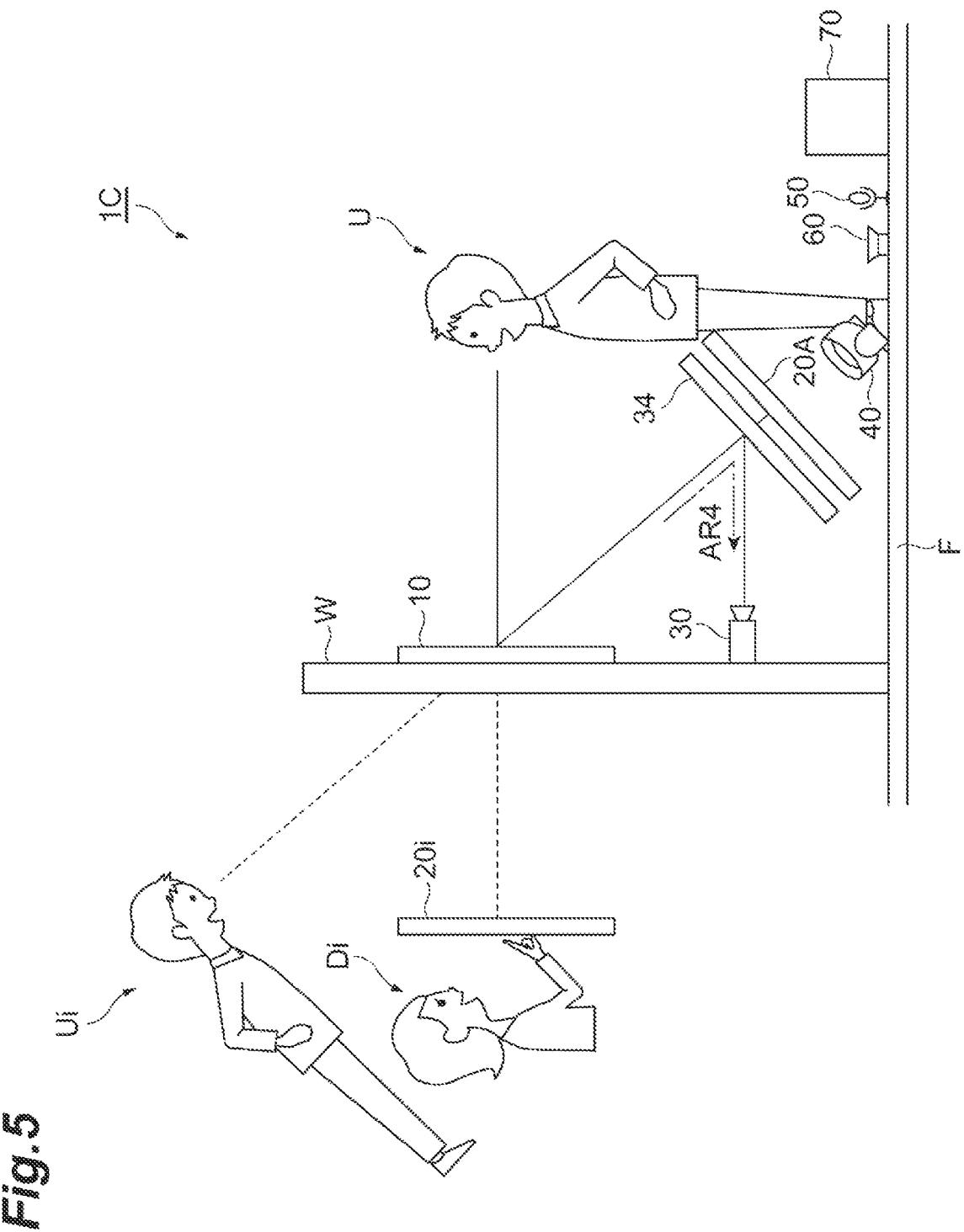
FIG. 5 is a view showing another example of the configuration of the picture presentation system.

A picture presentation system 1C shown in FIG. 5 is different from the picture presentation system 1 (FIG. 1) in that it includes a screen 20A in place of the screen 20 and further includes a semi-transparent mirror 34 and in the position of the camera 30. The screen 20A is a non-transmissive projector screen. The shape of the screen 20A may be the same as the shape of the screen 20. The semi-transparent mirror 34 is placed between the hologram mirror 10 and the screen 20. The semi-transparent mirror 34 is configured so that transmittance and reflectance are the same, for example. The camera 30 is placed so as to take a picture of the hologram mirror 10 by using reflection on the semi-transparent mirror 34 (arrow AR4). In the example shown in FIG. 5, the semi-transparent mirror 34 is placed opposite to the screen 20A. The semi-transparent mirror 34 may be mounted on the floor F using a fixation member (not shown), like the screen 20A. Note that, however, the positions of the semi-transparent mirror 34 and the camera 30 are not limited to the example shown in FIG. 5. According to the picture presentation system 1C, because the camera 30 uses the reflection of the semi-transparent mirror 34, it is possible to increase the freedom of the mounting position of the camera 30.

Figure 6:
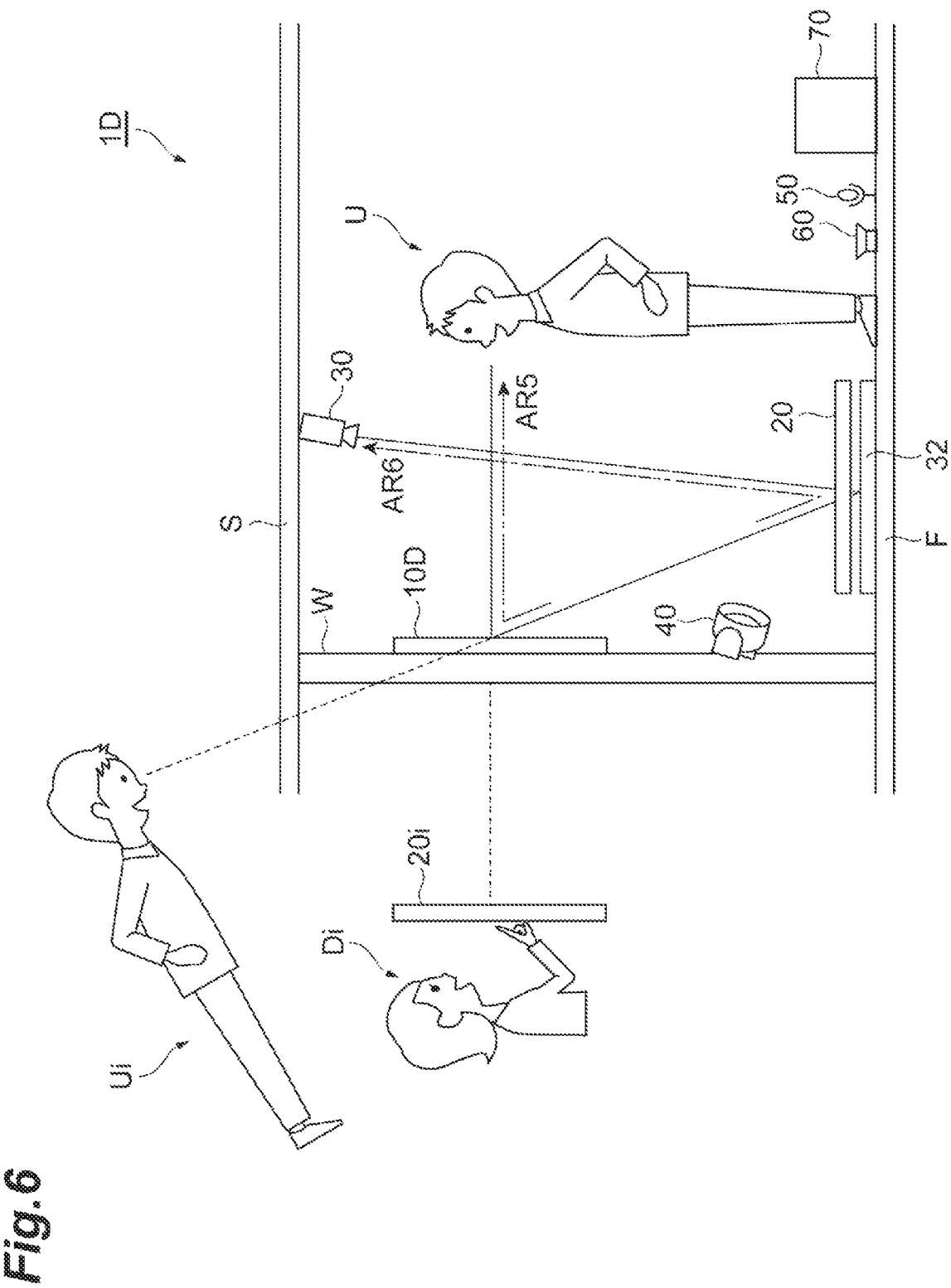
FIG. 6 is a view showing another example of the configuration of the picture presentation system.

A picture presentation system 1D shown in FIG. 6 is different from the picture presentation system 1B (FIG. 4) in that it includes a hologram mirror 10D in place of the hologram mirror 10 and in the positions of the screen 20, the camera 30 and the mirror 32. In the picture presentation system 1D, the screen 20 and the mirror 32 are mounted parallel to the floor F. The hologram mirror 10D is mounted on the wall W just like the hologram mirror 10, and it reflects a picture from the screen 20 in such a way that the user U can visually recognize the virtual image of the picture at a position on the opposite side from the user U across the hologram mirror 10 (arrow AR5). The camera 30 is mounted on a ceiling S so as to take a picture of the reflecting surface of the mirror 32 through the screen 20 (arrow AR6). The ceiling S extends vertically to the wall W so as to be opposite to the floor F. According to the picture presentation system 1D, just like the picture presentation system 1B (FIG. 4), because the camera 30 uses the reflection of the mirror 32, it is possible to increase the freedom of the mounting position of the camera 30.

Although an embodiment of the present invention is described above, the present invention is not limited to the above-described embodiment.

For example, although an example in which both of the user U and the other party D use the picture presentation system 1 and perform interactive communication as shown in FIG. 2 is described in the above embodiment, the other party D may use a different system from the picture presentation system 1. In the example shown in FIG. 7, the other party D uses an existing video telephone system 90. The video telephone system 90 can communicate with (the communication unit 78 of) the picture presentation system 1 by using a communication unit 97. In the video telephone system 90, under control of a control unit 95, a display unit 91 composed of a display device such as a display displays a picture of the user U transmitted from the picture presentation system 1. A camera 92 takes a picture of the other party D, and the communication unit 97 transmits this picture to the picture presentation system 1. A speaker 93 outputs the voice of the user U transmitted from the picture presentation system 1. A microphone 94 collects the voice of the other party D, and the communication unit 97 transmits this sound to the picture presentation system 1. A storage unit 96 stores various types of information required for processing to be executed by the control unit 95.

Figure 7:
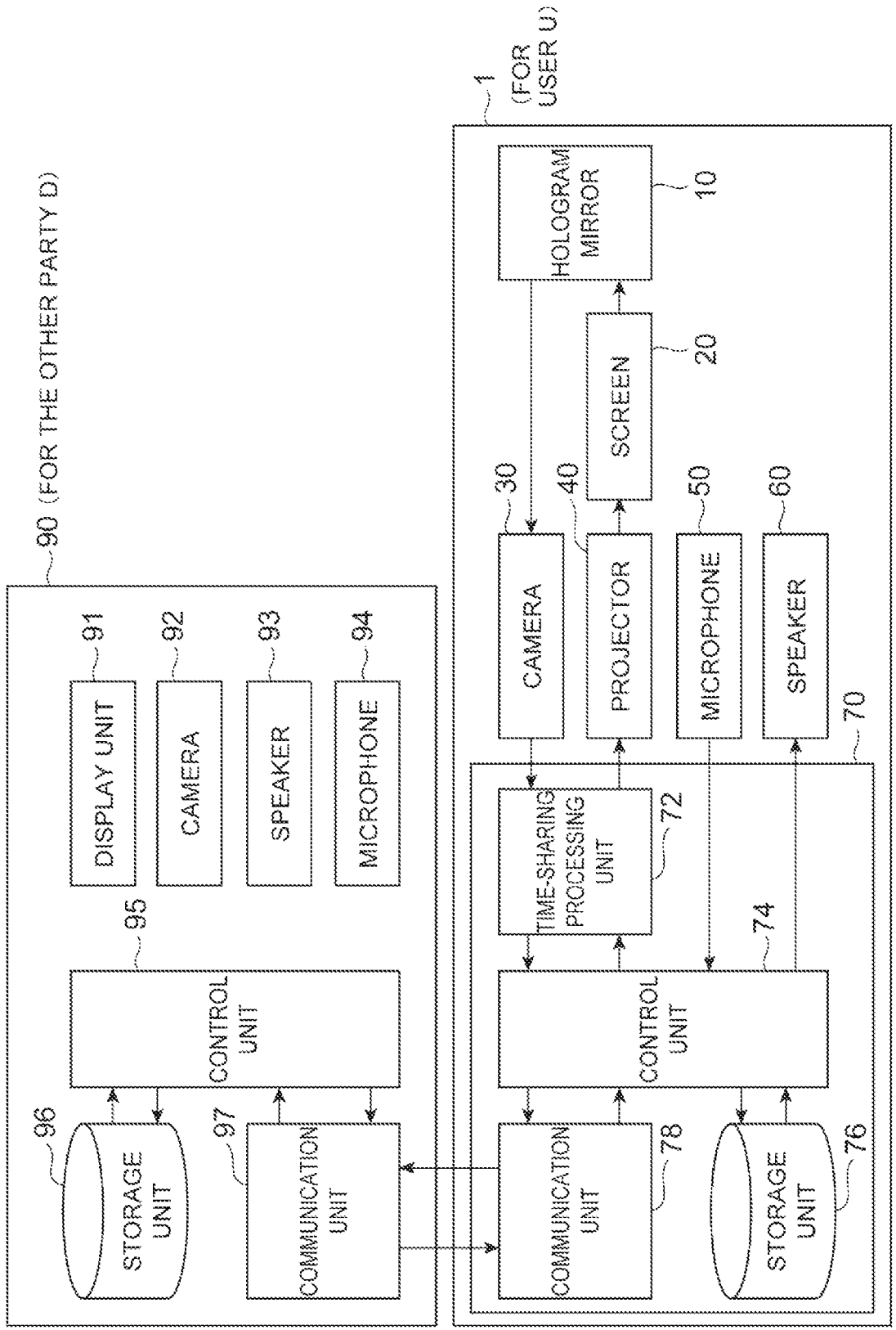
FIG. 7 is a block diagram of another example of the picture presentation system.

In the configuration shown in FIG. 7 also, it is possible to transmit and receive the pictures and the voice of the user U and the other party D between the picture presentation systems 1 and the video telephone system 90, which enables interactive communication between the user U and the other party D.

Further, an example of using the screen 20, which is a transmissive screen, or the screen 20A, which is a non-transmissive screen, is described in the above embodiment. Besides, a screen capable of switching between transmissive and non-transmissive states may be used. An example of such a screen is a liquid crystal screen. The liquid crystal screen is opaque and functions as a non-transmissive screen when no voltage is applied (OFF state). The liquid crystal screen is transparent when a voltage is applied (ON state). The transmission rate (transmittance) of the liquid crystal screen in the OFF state can be lower than that of the screen 20, which is a transmissive screen. The transmission rate of the liquid crystal screen in the ON state can be higher than that of the screen 20, and lower haze is achieved. Therefore, as described earlier with reference to FIG. 1, for example, when projecting and displaying a picture from the projector onto the screen, high-luminance projection is achieved by using the liquid crystal screen in the OFF state. Further, when the camera takes a picture of the hologram mirror through the screen, high-transmission and low-haze picture taking is achieved by using the liquid crystal screen in the ON state.

Further, although an example in which the wall W can be made using an opaque material is described in the above embodiment, the wall W may be made using a transparent material such as glass. In this case, it is desirable to impart, to the hologram mirror 10, wavelength selectivity that reflects (does not transmit) the wavelength of light that can be taken by the camera 30, for example, in order to prevent the space on the opposite side from the camera 30 across the hologram mirror 10 (i.e., the space not intended to be taken by the camera) from being taken by the camera 30. Note that the hologram mirror 10 is not necessarily mounted on the wall W as long as it is placed in front of the user U. In the case where there is a space for placing the camera 30 between the hologram mirror 10 and the wall W, it is feasible to impart, to the hologram mirror 10, wavelength selectivity that transmits (does not reflect) the wavelength of light that can be taken by the camera 30, conversely to the above description. In this case, a projected image of the other party D is reflected by the hologram mirror 10 and visually recognized as a virtual image by the user U, and a taken picture of the user U passes through the hologram mirror 10 and is directly taken by the camera 30 mounted at the back of the hologram mirror 10. Thus, the camera 30 may be placed behind the hologram mirror 10 when viewed from the user U and, in this case, the camera 30 takes a picture of the user U (from the front) through the hologram mirror 10.

It should be noted that the block diagram of the control device 70 described earlier with reference to FIG. 2 shows the block of each functional unit. Those functional blocks (component parts) are implemented by any combination of hardware and/or software. Further, a means of implementing each functional block is not particularly limited. Specifically, each functional block may be implemented by one physically and/or logically combined device or may be implemented by two or more physically and/or logically separated devices that are directly and/or indirectly connected (e.g., wired and/or wireless connections).

For example, the control device 70 may function as a computer that performs processing necessary for picture presentation by the picture presentation system according to this embodiment. The control device 70 may be physically configured as a computer device including a processor, a memory, a storage, a communication device, an input device, an output device, a bus and the like.

In the following description, the term "device" may be replaced with a circuit, a device, a unit or the like. The hardware configuration of the control device 70 may be configured to include one or a plurality of the above-described devices or may be configured without including some of the devices.

The functions of the control device 70 may be implemented by allowing predetermined software (programs) to be loaded on the hardware such as the processor, the memory and the like so as to cause the processor to perform computations to control communications by the communication device, and reading and/or writing of data in the memory and the storage.

The processor may, for example, operate an operating system to control the entire computer. The processor may be configured to include a CPU (Central Processing Unit) including an interface with a peripheral device, a control device, an arithmetic device, a register and the like. For example, the above-described control unit 74 may be implemented by the processor.

Further, the processor loads a program (program code), a software module and data from a storage and/or a communication device into a memory and performs various processing according to them. As the program, a program that causes a computer to execute at least some of the operations described in the above embodiment is used. For example, the control unit 74 may be implemented by a control program that is stored in the memory and operates on the processor, and another functional block may be implemented in the same manner Although the above-described processing is executed by one processor in the above description, the processing may be executed simultaneously or sequentially by two or more processors. The processor may be implemented in one or more chips. Note that the program may be transmitted from a network through a telecommunications line.

The memory may be a computer-readable recording medium, and it may be composed of at least one of ROM (Read Only Memory), EPROM (Erasable Programmable ROM), EEPROM (Electrically Erasable Programmable ROM), RAM (Random Access Memory) and the like, for example. The memory may be also called a register, a cache, a main memory (main storage device) or the like. The memory can store a program (program code), a software module and the like that can be executed for implementing picture presentation by the picture presentation system according to an embodiment.

The storage is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage may be referred to as an auxiliary storage device. The above-described storage medium may be a database, a server, or another appropriate medium including the memory and/or the storage, for example.

The communication device is hardware (a transmitting and receiving device) for performing communication between computers via a wired and/or wireless network, and it may also be referred to as a network device, a network controller, a network card, a communication module, or the like. For example, the above-described communication unit 78 may be implemented by the communication device.

The input device is an input device (e.g., a keyboard, a mouse, a microphone, a switch, a button, and a sensor) that receives an input from the outside. The output device is an output device (e.g., a display, a speaker, and an LED lamp) that generates an output to the outside. Note that the input device and the output device may be integrated (e.g., a touch panel).

In addition, the devices such as the processor and the memory are connected by a bus for communicating information. The bus may be a single bus or may be composed of different buses between different devices.

Further, the control device 70 may include hardware such as a microprocessor, a DSP (Digital Signal Processor), an ASIC (Application Specific Integrated Circuit), a PLD (Programmable Logic Device), and an FPGA (Field Programmable Gate Array), or some or all of the functional blocks may be implemented by the above-described hardware components. For example, the processor may be implemented with at least one of these hardware components.

In the above description, it is apparent to those skilled in the art that the present invention is not restricted to the embodiment described in this specification. The present invention can be implemented as a modified and changed form without deviating from the spirit and scope of the present invention defined by the appended claims. Accordingly, the description of the present specification is given merely by way of illustration and does not have any restrictive meaning to the present invention, Notification of information may be made by another method, not limited to the aspect/embodiment described in the present specification. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each aspect/embodiment described in the present specification may be applied to LTE (Long Term Evolution), LTE-A (LTE Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), a system using another appropriate system and/or a next generation system extended based on these systems.

The procedure, the sequence, the flowchart and the like in each aspect/embodiment described in this specification may be in a different order unless inconsistency arises. For example, for the method described in this specification, elements of various steps are described in an exemplified order, and it is not limited to the specific order described above.

The information or the like can be output from an upper layer (or lower layer) to a lower layer (or upper layer). It may be input and output through a plurality of network nodes.

Input/output information or the like may be stored in a specific location (e.g., memory) or managed in a management table. Further, input/output information or the like can be overwritten or updated, or additional data can be written. Output information or the like may be deleted. Input information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each aspect/embodiment described in the present specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Software may be called any of software, firmware, middleware, microcode, hardware description language or another name, and it should be should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

The information, signals and the like described in the present specification may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present specification and/or the term needed to understand the present specification may be replaced by a term having the same or similar meaning. For example, a channel and/or a symbol may be a signal. Further, a signal may be a message. Furthermore, a component carrier (CC) may be called a carrier frequency, a cell or the like.

The terms "system" and "network" used in the present specification are used to be compatible with each other.

Further, information, parameters and the like described in the present specification may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present specification in some cases. Because various channels (e.g., PUCCH, PDCCH etc.) and information elements (e.g., TPC etc.) can be identified by every appropriate names, various names assigned to such various channels and information elements are not definitive in any way.

When the terms such as "first" and "second" are used in this specification, any reference to the element does not limit the amount or order of the elements in general. Those terms can be used in this specification as a convenient way to distinguish between two or more elements. Thus, reference to the first and second elements does not mean that only two elements can be adopted or the first element needs to precede the second element.

As long as "include", "including" and variations of them are used in the present specification or claims, those terms are intended to be comprehensive like the term "comprising". Further, the term "or" used in the present specification or claims is intended not to be exclusive OR.

In the present disclosure, reference to an element includes both one and more than one of such element unless it is clearly stated that it is singular.

REFERENCE SIGNS LIST 1, 1A, 1B, 1C, 1D . . . picture presentation system, 10, 10D . . . hologram mirror, 20, 20A . . . screen, 30 . . . camera, 40 . . . projector, 50 . . . microphone, 60 . . . speaker, 70 . . . control device, 72 . . . time-sharing processing unit, 74 . . . control unit, 76 . . . storage unit, 78 . . . communication unit

The invention claimed is:

1. A picture presentation system that shows a user with a virtual image in a space in front of the user, comprising:
   a hologram mirror configured to reflect light of a specific wavelength at an angle different from an angle of incidence and transmit light other than the light of the specific wavelength; and
   a screen configured to display a picture toward the hologram mirror, wherein
   the hologram mirror, being placed opposite to the user, reflects the picture from the screen in such a way that the user can visually recognize a virtual image of the picture at a position on the opposite side from the user across the hologram mirror, the screen being disposed at a position along a floor between the user and the hologram mirror and the screen facing a same surface of the hologram mirror that the user is facing.

2. The picture presentation system according to claim 1, further comprising:
   a camera configured to take a picture of the hologram mirror from a user side, wherein
   the camera is placed at a position along the floor between the user and at least a portion of the screen so as to take a virtual image of the user at a position on the opposite side from the camera across the hologram mirror.

3. The picture presentation system according to claim 2, wherein
   the screen is configured to alternately switch between two states: a first state of displaying the picture toward the hologram mirror and a second state of transmitting light without displaying the picture, and
   the camera is placed on the opposite side from the hologram mirror across the screen.

4. The picture presentation system according to claim 2, further comprising:
   a mirror placed on the opposite side from the hologram mirror across the screen at a position along the floor between the user and at least a portion of the screen, wherein
   the camera is placed so as to take a picture of the hologram mirror by using reflection on the mirror.

5. The picture presentation system according to claim 2, further comprising:
   a semi-transparent mirror placed between the hologram mirror and the screen, wherein
   the camera is placed so as to take a picture of the hologram mirror by using reflection on the semi-transparent mirror.

6. The picture presentation system according to claim 1, further comprising:
   a camera placed behind the hologram mirror when viewed from the user, wherein
   the camera takes a picture of the user through the hologram mirror.

* * * * *